UNITED STATES PATENT OFFICE.

JEAN EYQUEM, OF PARIS, FRANCE.

IMPROVEMENT IN THE MANUFACTURE OF STEEL.

Specification forming part of Letters Patent No. 161,398, dated March 30, 1875; application filed February 20, 1875.

*To all whom it may concern:*

Be it known that I, JEAN EYQUEM, of Paris, France, have invented a new Process of Manufacture of Steel; and I do hereby declare that the following is a full, clear, and exact description of the same.

Of all theories emitted recently to explain the phenomena of steelification of iron, that of the eminent French chemist, Mr. Tremy, seems to me to best account for the observed facts. Mr. Tremy thinks that it is under the simultaneous influence of ammoniacal gas and carbonated-hydrogen gas that iron carried to a sufficient temperature is converted into steel in passing to the state of azoto-carburet of iron. Such a reaction I have contrived to produce and utilize industrially or on a large scale.

Being well aware how inconvenient is the use of gases in industry, I have thought of bringing in contact iron with materials liable to produce simultaneously in determined proportions both ammoniacal gas and carbonated-hydrogen gas by their decomposition at a proper temperature to effect the steelification or conversion of iron into steel.

My attention was at first fixed on peat, which, upon its decomposition by heat, will produce ammonia and proto-carbonated hydrogen.

Having placed in a fire-clay vessel, properly luted, some iron bars, with pulverized peat, these bars were completely transformed into steel at a temperature of 1300° Fahrenheit, more rapidly than by a mixture of the gases separately produced.

I have observed that the addition of some one one-hundredths of an ammoniacal salt, principally hydrochlorate, would accelerate and render more perfect the conversion of iron into steel.

I assign the rapidity of such transformation to the circumstance, namely, that the ammoniacal and carbonated-hydrogen gases are in the nascent state in the presence of iron, and it is well known how far more energetic the chemical affinities are in that state.

I have obtained like results with the following materials, together with an addition of ammoniacal salt, to wit, tan-waste, sawdust, lignite, coal, resins, mineral oils, grease, either solid or liquid hydrocarbons, animal matters, and any other materials supplying carbonated hydrogen; but some of these liquid materials, sometimes rather energetic, cannot be always employed alone, and it is necessary to admix some inert powdered substances.

However, peat is the substance I prefer to use, and this alone I will mention hereinafter, though its absence may be substituted for by the above materials.

The steel produced in this manner is of excellent quality, and can be used without previous preparation to manufacture files, springs, and the like. Worked at a temperature comparatively low, the bars shall not be covered with those rugosities or blisters, by which latter name cemented steel is commonly known, (blister steel,) and I have remarked that the quality of the iron used does not sensibly influence that of the steel produced.

I use common reverberatory furnaces or large muffle furnaces, into which I introduce either fire-clay or cast-iron chests containing the bars with the cement. A continuous working, the rapidity of the operation, the comparatively low temperature at which the work is effected, the low price of the cement, which has to be but partially renewed, will procure a notable economy over the process in use.

Having remarked how rapidly the cementation of small bulk irons was effected, I have in one single operation effected the cementation and fusion of iron-scraps. I threw into a common steel crucible scraps of iron, together with three to six per cent. of peat, according to the nature of the steel I wished to produce, and one per cent. of ammoniacal salt. The crucible, placed in a common oven, was maintained for four hours at a glowing red heat, and raised rapidly to the fusing heat. The result was a good quality of steel.

To produce such steel at a cheaper rate, I use a reverberatory furnace, preferably Pousard's or Siemens'; but in either case care must be had to produce but reducing flames, less injurious than oxidizing ones.

The operation is as follows: On the hearth I charge the scraps, together with the required mixture, which I pile up, ramming them down soundly by means of a bat. I then spread over the whole a layer of pulverized slags or scoriæ of same nature. I keep on a red heat for four hours, and raise afterward the temperature to the fusing point.

The preparing of the hearth and the casting process are the same as for the manufacture of puddled steel.

The energetic reductive action of the gases produced by peat induced me to manufacture steel by treating directly iron ores, artistic rich iron products, pulverized scoriæ from iron-works, which materials I mixed with peat-dusts and from one to one and one-half per cent. of ammoniacal salt, the whole gently and progressively heated, and from their fusion I obtained steel.

Whether ores or scoriæ are treated, there is no other addition to be made thereto than the slag layer as protection from the flames, as above explained, with reference to scraps.

I claim—

The process, herein described, of converting iron into steel by placing the iron, together with pulverized peat and with an ammoniacal salt, preferably hydrochlorate, into a furnace, and heating, so that the gases given off by the decomposing peat and hydrochlorate will affect the iron, substantially as set forth.

JEAN EYQUEM.

Witnesses:
CHARLES DESNOS,
ROBT. M. HOOPER.